United States Patent [19]

George

[11] 4,180,016
[45] Dec. 25, 1979

[54] SAFETY PET COLLAR

[76] Inventor: William M. George, 550 Brickell Ave., Miami, Fla. 33129

[21] Appl. No.: 861,533

[22] Filed: Dec. 19, 1977

[51] Int. Cl.$^2$ ............................................. A01K 27/00
[52] U.S. Cl. ................................... 119/106; 119/156; 24/255 SL
[58] Field of Search ............... 119/106, 156; 24/20 R, 24/20 S, 72, 256, 255 SL, 206 A

[56] References Cited
U.S. PATENT DOCUMENTS

| 2,900,696 | 8/1959 | Bacon | 119/106 X |
| 4,044,725 | 8/1977 | Miller | 119/106 |

Primary Examiner—Hugh R. Chamblee
Attorney, Agent, or Firm—Barry L. Haley; Eugene F. Malin

[57] ABSTRACT

An improved pet safety flea collar which provides a frictional release of the collar when an animal becomes entangled to prevent strangulation of the animal. The collar includes a free end and a flared end having a chamber, sized to receive the free end of the collar such that a frictional engagement is achieved between the free end of the collar and the flared end chamber. The flared end chamber is shaped in the same contour and cross-section as the free end. The depth of the chamber is selected to provide sufficient penetration of the free end to establish the necessary frictional force to withstand scratching and normal movements of the animal while allowing release should the animal pull with sufficient force if tangled by the collar and an object. The material utilized for the body of the collar is a conventional flea collar material that dispenses an insecticide.

2 Claims, 3 Drawing Figures

SAFETY PET COLLAR

BACKGROUND OF THE INVENTION

This invention relates generally to a safety flea collar, and specifically to an improved safety flea collar which allows for the release of the collar when an animal becomes tangled by the collar around an object to prevent strangulation of the animal.

Conventional flea collars for domestic animals such as dogs or cats provide a hazard for the animals should the collar become entangled on a bush, tree, fence or the like in that conventional flea collars have a buckle which will not release when a force is applied to the collar. The prior art shows safety collars which can be characterized as complex in construction and operation which require special eyelets, fasteners, clasps and the like for operation. Examples are shown in U.S. Pat. Nos. 2,612,129; 3,131,674; 3,011,478; 3,589,341; and 3,994,265.

The present invention overcomes the deficiencies and complex construction shown in the prior art by providing a safety flea collar which functions to offer protection against parasites, such as ticks, fleas and the like, while allowing for the animal to disengage himself from the collar should it become entangled by the collar with an object. The present invention further provides for a collar of non-complex construction which may be readily fabricated and which functions without operational dependency upon complex structural interaction between particular types of moving parts, such as clamps, pins, clasps and the like.

BRIEF DESCRIPTION OF THE INVENTION

A safety flea collar for a domestic animal which allows for a frictional lock between the ends of the collar to retain the collar about the neck of a domestic animal while allowing for disengagement of the collar ends upon the application of a predetermined force which overcomes the frictional engagement. The collar is comprised of a single unitary strip, consisting of a plasticized vinyl polymer plus insecticides of a conventional type which is dimethyl 1, 2-dibromo-2, 2-dichloroethyl phosphate (naled) in a synthetic resin (PVC) collar, with one end of the collar having a flared end tip with a hollow chamber sized and shaped to receive the opposite, normal-sized free end of a collar in a frictional engagement so that the free end snuggly fits within the hollow chamber of the flared end. A particular depth of the hollow end chamber is selected to provide a predetermined amount of frictional force which establishes the amount of force required to disengage the flared end from the free end. The hollow chamber walls act as a female recess of the same cross-sectional shape and size as the rest of the collar body including the opposite free end of the collar. The collar may be cut at the free end to any desired length to provide an individualized fit for a particular pet. Insertion of the free end into the passage allows for engagement of the free end sidewalls with the hollow passage walls creating a particular amount of frictional resistance to disengagement, which acts to retain the collar on the animal's body during normal movements of the animal, including such activities such as scratching and the like.

It is an object of this invention to provide an improved safety flea collar for a domestic animal such as a dog or cat which allows for full operation of the insecticide qualities of the collar while allowing an animal that is tangled by the collar to free himself without strangulation.

It is another object of this invention to provide an improved safety releaseable flea collar for a domestic animal which is non-complex in construction and operation and which does not require complex interacting moveable parts for its safety release.

In accordance with these and other objects which will be apparent hereinafter, the instant invention will now be described with particular reference to the accompanying drawings.

PREFERRED EMBODIMENT OF THE INVENTION

Figure 1:
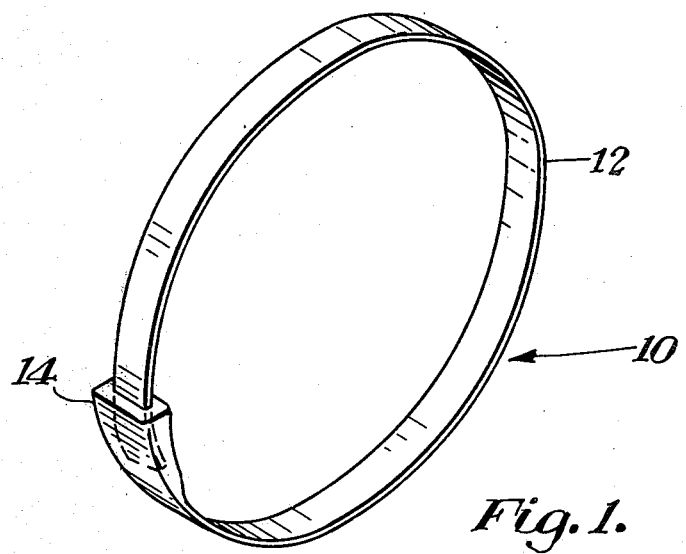
FIG. 1 shows a perspective view of the safety flea collar constructed in accordance with the instant invention in a closed or engaged position.

Referring now to the drawings and specifically FIG. 1, the instant invention is shown generally at 10 comprised of a flexible vinyl polymer strip 12 formed in the shape of a ring which is receivable around the neck of a domestic animal, such as a cat. A strip body 12 is comprised of a material which acts as a conventional flea collar to destroy ticks, fleas and other insects residing on the outer body of the animal. One end of the collar body 12 has a flared portion 14 at one end.

Figure 2:
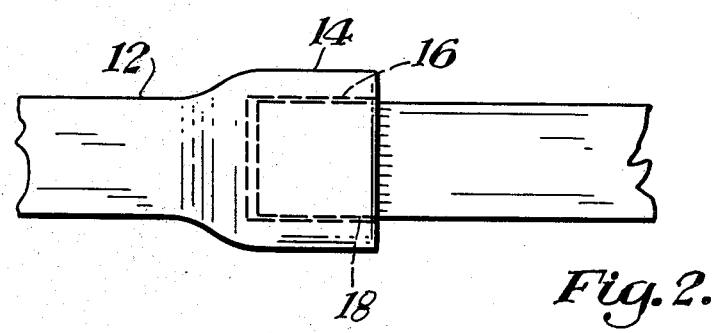
FIG. 2 shows a top, plan view, fragmented, of the ends of the safety collar engaged and constructed in accordance with the instant invention.
Figure 3:
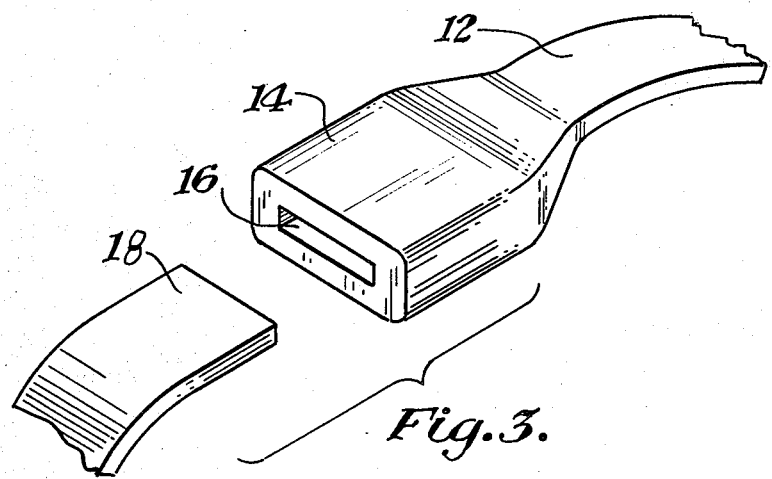
FIG. 3 shows a perspective view of the collar ends of the instant invention disengaged.

Referring now to FIGS. 2 and 3, the flared end 14 is shown having a hollow chamber 16 that is sized and shaped in cross-section to receive the opposite free end 18 of strip 12 snuggly within the flared end portion. Insertion of the free end 18 which is the same size as the hollow chamber frictionally engages the ends of the collar forming the neck ring. The depth of the hollow chamber can be varied to vary the frictional force necessary to disengage the collar ends. In one embodiment, the free end is disposed one inch in the hollow chamber.

The cross-sectional shape and size of the strip is uniform up to the flared end tip so that the strip may be cut in any desired length for a particular pet.

The instant invention has been shown and described herein in what is considered to be the most practical and preferred embodiment. It is recognized, however, that departures made be made therefrom within the scope of the invention and that obvious modifications will occur to a person skilled in the art.

What I claim is:

1. An improved safety flea collar for a domestic animal, comprising:
an elongated flexible strip having a pesticide embedded therein for killing fleas, ticks and the like, said strip having an end with a hollow chamber and an opposite free end, said end hollow chamber having a predetermined depth and being sized and shaped to be substantially the same size, contour and cross-section as said free end of said collar, said free end being insertable into said end hollow chamber, said free end when inserted in said end hollow chamber a selected depth to provide for, a predetermined frictional force for resisting disengagement of said free end and said chamber end.

2. A device as in claim 1, wherein:
said end having said hollow chamber is flared.

* * * * *